US009274506B2

(12) United States Patent
Lu

(10) Patent No.: US 9,274,506 B2
(45) Date of Patent: Mar. 1, 2016

(54) WEARABLE ELECTRONIC DEVICE

(71) Applicant: Cheng Uei Precision Industry Co., Ltd., New Taipei (TW)

(72) Inventor: Wen Ting Lu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 152 days.

(21) Appl. No.: 14/166,924

(22) Filed: Jan. 29, 2014

(65) Prior Publication Data

US 2015/0212541 A1 Jul. 30, 2015

(51) Int. Cl.

| | |
|---|---|
| ***G06F 1/16*** | (2006.01) |
| ***G04G 17/08*** | (2006.01) |
| ***G04G 17/02*** | (2006.01) |
| ***A44C 5/14*** | (2006.01) |

(52) U.S. Cl.

CPC ................ *G04G 17/083* (2013.01); *A44C 5/14* (2013.01); *G04G 17/02* (2013.01)

(58) Field of Classification Search

CPC .................................... G06F 1/16; H05K 5/00

USPC ...................................................... 361/679.3

See application file for complete search history.

(56) References Cited

U.S. PATENT DOCUMENTS

| | | | | |
|---|---|---|---|---|
| 4,066,855 A * | 1/1978 | Zenk | H01H 13/702 | 200/306 |
| 5,285,398 A * | 2/1994 | Janik | G06F 1/163 | 361/679.03 |
| 5,305,181 A * | 4/1994 | Schultz | B60R 11/02 | 345/168 |
| 5,361,169 A * | 11/1994 | Deal | B63C 11/02 | 359/517 |
| 5,418,760 A * | 5/1995 | Kawashima | G02F 1/13306 | 341/23 |
| 5,734,513 A * | 3/1998 | Wang | G02B 25/002 | 345/32 |
| 5,857,217 A * | 1/1999 | Hsueh | A44C 5/0007 | 2/170 |
| 5,931,764 A * | 8/1999 | Freeman | G04G 9/00 | 361/679.03 |
| 6,107,988 A * | 8/2000 | Phillipps | G06F 1/1616 | 345/156 |
| 6,220,916 B1 * | 4/2001 | Bart | A63H 33/00 | 434/393 |
| 6,377,324 B1 * | 4/2002 | Katsura | G02F 1/133305 | 349/58 |
| 6,425,494 B1 * | 7/2002 | Woods, II | B65D 81/3879 | 215/12.1 |
| 6,577,496 B1 * | 6/2003 | Gioscia | G06F 1/1616 | 345/156 |
| 6,621,766 B2 * | 9/2003 | Brewer | G02B 26/026 | 368/10 |
| 7,347,019 B1 * | 3/2008 | Shaw | F16F 1/025 | 40/607.01 |
| 7,414,594 B2 * | 8/2008 | Kim | G02F 1/133526 | 345/1.1 |
| 7,558,057 B1 * | 7/2009 | Naksen | G06F 1/1613 | 361/679.3 |
| 7,848,093 B2 * | 12/2010 | Hardson | A44B 11/001 | 224/163 |
| 8,011,124 B1 * | 9/2011 | Temples | G06F 3/005 | 40/633 |
| 8,082,003 B2 * | 12/2011 | Jee | G04G 17/045 | 455/556.1 |
| 8,088,043 B2 * | 1/2012 | Andren | A63B 24/00 | 368/10 |
| 8,213,167 B2 * | 7/2012 | Kim | G02F 1/13336 | 345/1.1 |
| 8,369,075 B2 * | 2/2013 | Huang | G09F 9/33 | 248/297.21 |
| 8,462,106 B2 * | 6/2013 | Tziortzis | G06F 3/01 | 345/156 |
| 8,482,909 B2 * | 7/2013 | Douglas | A45C 5/0015 | 361/679.03 |

(Continued)

*Primary Examiner* — Courtney Smith
*Assistant Examiner* — Rashen E Morrison

(57) ABSTRACT

A wearable electric device includes a main body with a circuit module inside and at least a detachable battery strap with a battery module inside, and the main body and the detachable battery strap are detachably fastened together. A female buckle member is formed on the edge of the main body and includes a receiving chamber, a pair of locking notches arranged on the respective sides of the receiving chamber and a plurality of metal conductive points connected with the circuit module. A male buckle member is attached on the front part of the detachable battery strap to be fastened with the female buckle member and includes a plurality of pogo pin connectors for connecting with the metal conducting points, and a locking block for fastening with the receiving chamber.

1 Claim, 3 Drawing Sheets

(56) References Cited

U.S. PATENT DOCUMENTS

| | | | | | |
|---|---|---|---|---|---|
| 8,506,158 | B2 * | 8/2013 | Keung | A44C 5/0084 | 224/164 |
| 8,610,663 | B2 * | 12/2013 | Kim | G06F 3/033 | 345/156 |
| 8,727,189 | B2 * | 5/2014 | Zieman | D05B 91/00 | 223/109 A |
| 8,787,119 | B2 * | 7/2014 | Sorias | G04C 10/00 | 368/204 |
| 8,801,577 | B2 * | 8/2014 | Dibenedetto | A63B 24/0062 | 482/8 |
| 8,890,911 | B2 * | 11/2014 | Moriwaki | G09G 3/3208 | 345/1.3 |
| 8,970,455 | B2 * | 3/2015 | Thorson | G06F 3/147 | 345/105 |
| 8,976,628 | B2 * | 3/2015 | Leoni | G04G 21/00 | 368/10 |
| 2003/0026171 | A1 * | 2/2003 | Brewer | G02B 26/026 | 368/82 |
| 2003/0155389 | A1 * | 8/2003 | Swartzentruber | A44C 5/12 | 224/164 |
| 2004/0156270 | A1 * | 8/2004 | Weng | G04C 19/00 | 368/82 |
| 2006/0007368 | A1 * | 1/2006 | Slikkerveer | G09F 9/35 | 349/58 |
| 2006/0050169 | A1 * | 3/2006 | Misawa | G06F 1/1616 | 348/333.06 |
| 2006/0146488 | A1 * | 7/2006 | Kimmel | G06F 1/1616 | 361/679.04 |
| 2006/0209218 | A1 * | 9/2006 | Lee | G04G 9/00 | 349/1 |
| 2006/0273304 | A1 * | 12/2006 | Cok | H01L 51/0096 | 257/40 |
| 2006/0274036 | A1 * | 12/2006 | Hioki | G06F 3/0412 | 345/156 |
| 2007/0064542 | A1 * | 3/2007 | Fukushima | G04B 37/1486 | 368/282 |
| 2007/0232373 | A1 * | 10/2007 | Yoshida | G04G 21/04 | 455/575.6 |
| 2008/0303782 | A1 * | 12/2008 | Grant | G06F 1/1615 | 345/156 |
| 2009/0126243 | A1 * | 5/2009 | Schellingerhout | G09F 21/02 | 40/586 |
| 2009/0298554 | A1 * | 12/2009 | Kim | H04M 1/21 | 455/574 |
| 2010/0029327 | A1 * | 2/2010 | Jee | G04G 17/045 | 455/556.1 |
| 2010/0222110 | A1 * | 9/2010 | Kim | G06F 1/1616 | 455/566 |
| 2010/0227642 | A1 * | 9/2010 | Kim | H04M 1/72575 | 455/556.1 |
| 2011/0086680 | A1 * | 4/2011 | Kim | G06F 1/1626 | 455/574 |
| 2011/0188189 | A1 * | 8/2011 | Park | G05B 11/01 | 361/679.05 |
| 2011/0261002 | A1 * | 10/2011 | Verthein | G06F 1/181 | 345/174 |
| 2012/0002360 | A1 * | 1/2012 | Seo | G06F 1/1616 | 361/679.01 |
| 2012/0200991 | A1 * | 8/2012 | Ryu | G06F 1/1601 | 361/679.01 |
| 2012/0314546 | A1 * | 12/2012 | Brewer | G04G 17/04 | 368/281 |
| 2013/0010405 | A1 * | 1/2013 | Rothkopf | H04M 1/0216 | 361/679.01 |
| 2013/0044215 | A1 * | 2/2013 | Rothkopf | G06F 1/163 | 348/143 |
| 2013/0083496 | A1 * | 4/2013 | Franklin | G06F 1/1626 | 361/749 |
| 2013/0120106 | A1 * | 5/2013 | Cauwels | G06F 1/163 | 340/3.1 |
| 2013/0120459 | A1 * | 5/2013 | Dickinson | G06F 1/163 | 345/650 |
| 2013/0191741 | A1 * | 7/2013 | Dickinson | G06F 1/163 | 715/702 |
| 2013/0235008 | A1 * | 9/2013 | Kwon | G09G 3/20 | 345/204 |
| 2013/0265631 | A1 * | 10/2013 | Ahn | G09F 9/372 | 359/295 |
| 2014/0055924 | A1 * | 2/2014 | Baek | G05K 5/0017 | 361/679.01 |
| 2014/0160078 | A1 * | 6/2014 | Seo | G06F 3/017 | 345/175 |
| 2014/0337621 | A1 * | 11/2014 | Nakhimov | G06F 1/163 | 713/168 |
| 2015/0087919 | A1 * | 3/2015 | Johnson | A61B 5/486 | 600/301 |
| 2015/0111088 | A1 * | 4/2015 | Hiroki | H01M 10/0436 | 429/149 |
| 2015/0121228 | A1 * | 4/2015 | Lee | G06F 3/167 | 715/727 |
| 2015/0123106 | A1 * | 5/2015 | Yasumoto | B32B 43/006 | 257/40 |
| 2015/0187855 | A1 * | 7/2015 | Yamazaki | H01L 27/3262 | 257/40 |

* cited by examiner

WEARABLE ELECTRONIC DEVICE

BACKGROUND OF THE INVENTION

1. Field of the Invention

The present invention related to a wearable electronic device, especially related to a wearable electronic device with a detachable battery strap structure.

2. The Related Art

In order to be suitable for long wearing, the design of the wearable electronic device has to be balanced between the comfort of wearing and the battery life. Taking the smart watch as an example, all of the components of a smart watch are arranged inside the main body, so the thickness of the main body is generally more than 16 millimeters, and it makes users less comfortable when wearing it. The thickness of a thinner smart watch is still about 10 millimeters, but the thinner watch trades off mostly the volume of the battery, and causes the shortage of battery life.

In response, some sorts of smart watches use the battery strap to reduce the thickness of the watch without shortening the battery life, and moving the battery from the main body to the strap can also help the weight balance. However, the battery strap needs to be removed before recharging, and it is very inconvenient because the battery strap is too difficult to be removed.

In order to make the smart watch easier to be recharged, the present invention provides a detachable battery strap structure which can be detached from and fastened to the main body quickly, and it can also enhance the user experience.

SUMMARY OF THE INVENTION

An objective of the present invention is to provide a wearable electronic device with a detachable battery strap which can be detached and fastened quickly.

To achieve the objective, the wearable electronic device in this invention includes a main body with a circuit module inside and at least a detachable battery strap with a battery module inside, the main body and the detachable battery strap are detachably fastened together. A female buckle member is formed on the edge of the main body and the female buckle member includes a receiving chamber, a pair of locking notches arranged on the respective sides of the receiving chamber and a plurality of metal conductive points connected with the circuit module. A male buckle member is attached on the front part of the detachable battery strap to be fastened with the female buckle member, the male buckle member includes a pair of side faces respectively arranged, a connecting face and a bottom face, a pair of locking grooves are respectively formed on both side faces for receiving the locking notches, a plurality of pogo pin connectors connected with the battery module are arranged on the connecting face for connecting with the metal conducting points, and a locking block extended from the bottom face of the male buckle member for fastening with the receiving chamber.

To fasten the battery strap with the main body, the grooves are aligned with the notches and the male buckle member is inserted into the female buckle member, then the male buckle member is rotated down till the locking block is embedded in the receiving chamber to fix the battery strap, and the pogo pin connectors are made to contact with the metal conductive points to establish an electronic connection between the battery strap and the main body. The stretching force of the pogo pin connectors will push the male buckle member to force the locking block pressing against the receiving chamber to increase the fastening force. In summary, with the male and female buckle members, the battery strap and the main body can be detached or fastened quickly, and allow user to change the battery strap much easier.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical content of the present invention, structural characteristics, and the purpose and effectiveness of the following examples are disclosed in detail.

Figure 1:
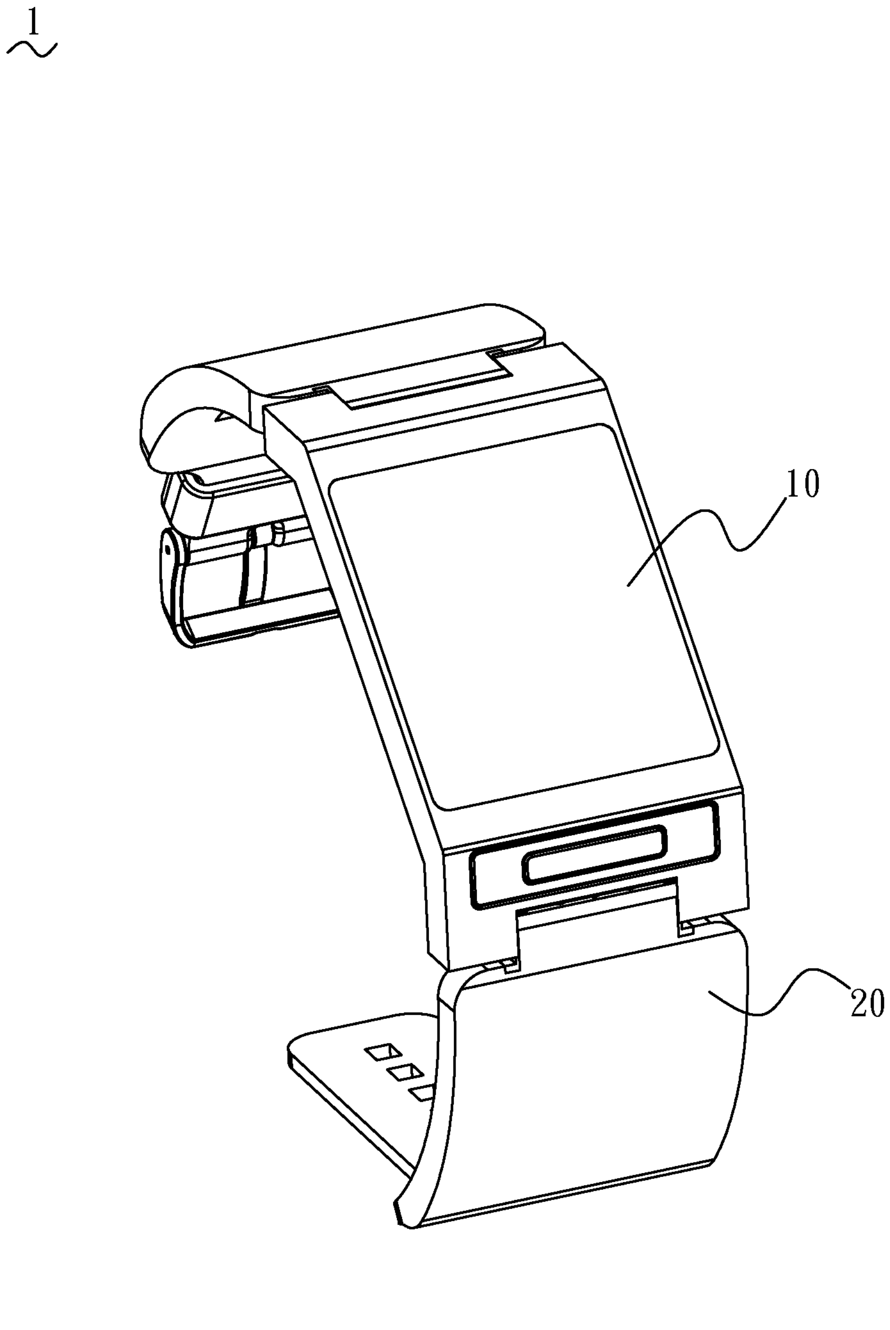
FIG. 1 shows a perspective view of the wearable electronic device in the present invention.

Referring to FIG. 1, the wearable electronic device in this embodiment includes a main body 10 with a circuit module 11 inside and at least a detachable battery strap 20 with a battery module 21 inside, and the main body 10 and the detachable battery strap 20 are detachably fastened together to supply power to the main body 10.

Figure 2:
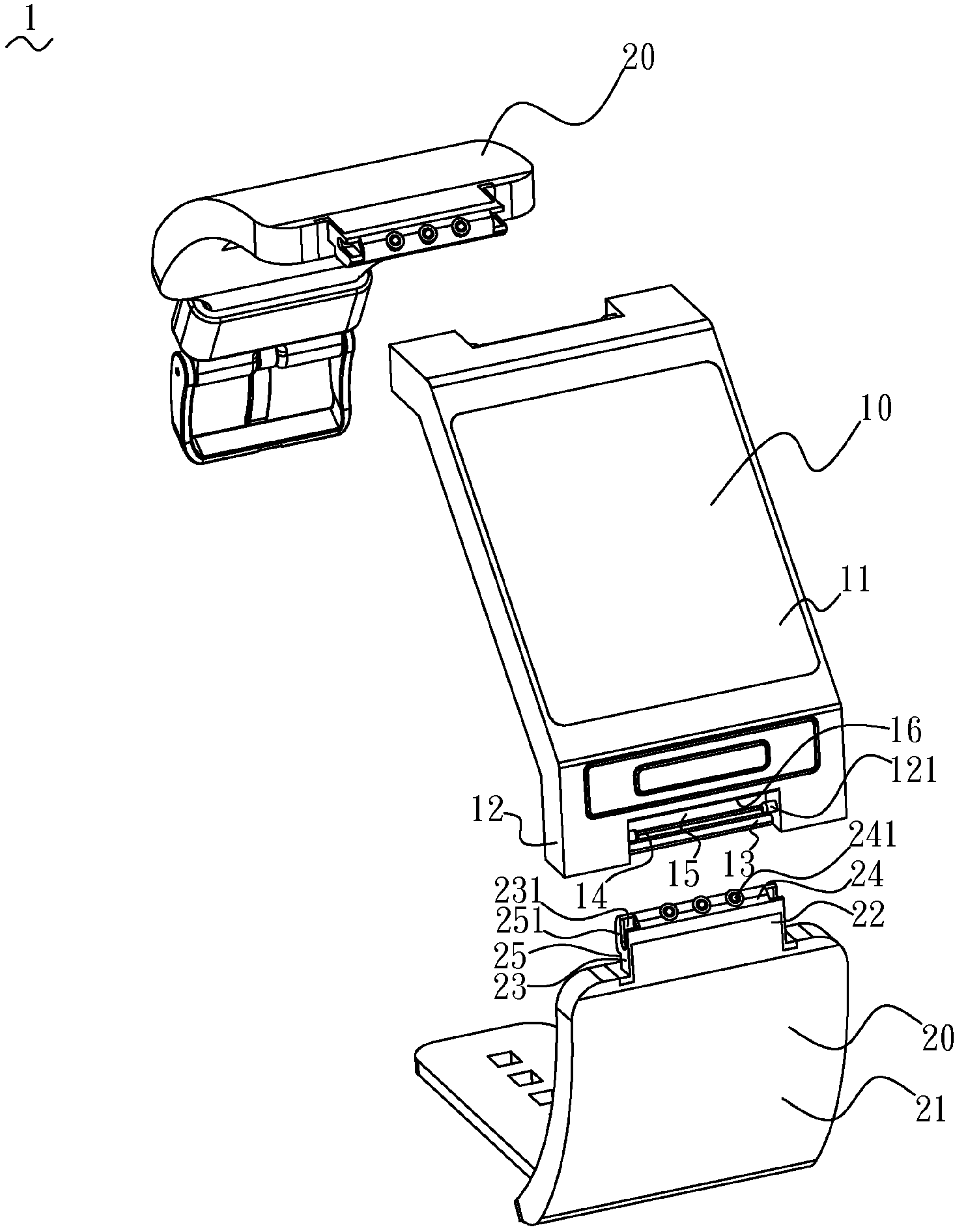
FIG. 2 is a schematic diagram that shows the battery strap being detached with the main body.
Figure 3:
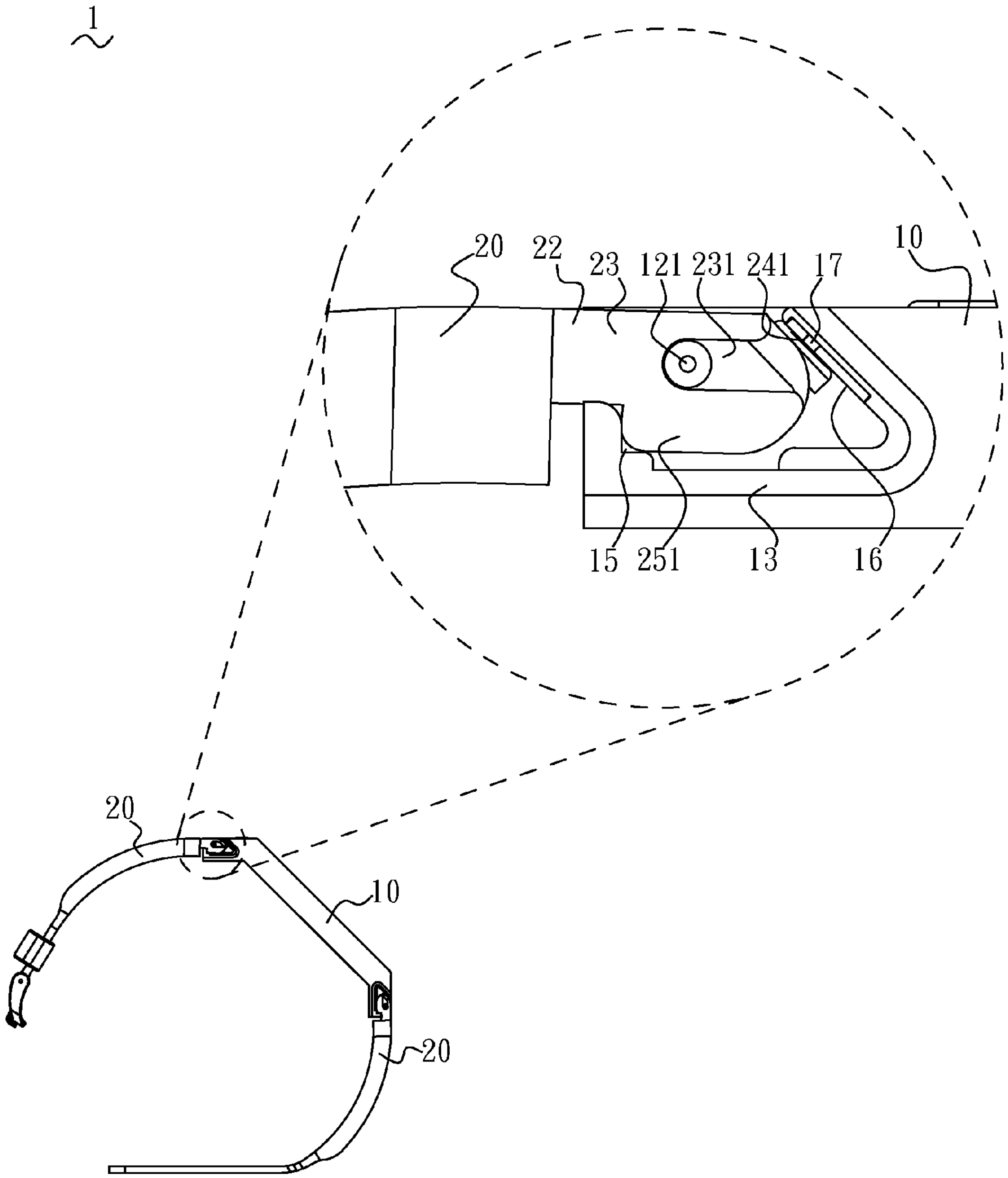
FIG. 3 shows a cross-section view of the female and male buckle members in this invention.

Referring to FIG. 2 and FIG. 3 now, the main body 10 includes a circuit module 11 inside, a pair of side walls 12 and a bottom wall 13 extended from the edge of the main body 10, the side walls 12 are bilaterally spaced on both sides of the main body 10 and form a female buckle member 14 with the bottom wall 13 and the main body 10 together. A receiving chamber 15 is concaved into the bottom wall 13 and forms an opening on the inner surface of the bottom wall 13; a conducting face 16 is settled on a slant inner surface of the receiving chamber 15 within the female buckle member 14 and between both side walls 12 in the main body 10. In this embodiment, the female buckle member 14 forms an empty opening above itself.

A plurality of metal conductive points 17 connected with the circuit module are arranged on the conducting face 16, a pair of notches 121 are arranged respectively on both side walls 12, and the notches 121 are extended from the inner surface of side walls 12 for a bit distance vertically.

The battery strap 20 includes a battery module 21 inside, a male buckle member 22 is formed on the end of the battery strap 20 for inserting into the female buckle member 14 and the male buckle member 22 includes a pair of side faces 23 arranged to contact the side walls 12, a front face 24 arranged to contact with the metal conducting points 17 and a bottom face 25 arranged to contact the bottom wall 13.

A pair of locking grooves 231 are respectively formed on both side faces 23, the locking groove 231 forms an opening that opens to the side face 23 and the front face 24, and a plurality of pogo-pin connectors 241 are arranged on the front face 24 to contact with the metal conductive points 17. In this embodiment, the pogo-pin connector is a probe connector which is connected with the battery module 21, a locking block 251 in rectangular shape is extended from the bottom face 25 to contact with the receiving chamber 15, and when the male buckle member 22 is inserted into the female buckle member 14, the locking block 251 is embedded in the receiving chamber 15 to avoid looseness.

Wherein the angle between the bottom wall 13 and the conducting face 16 is selected in a range between 30 to 90 degrees, and the preferred angle is 45 degrees. The angle between the front face 24 and the bottom face 25 is selected in a range between 30 to 90 degrees to be fit with the conducting face 16 and the bottom wall 13, and the preferred angle is 45 degrees.

The process to fasten the battery strap 20 with the main body 10 includes the steps of: aligning the locking grooves 231 of the battery strap 20 with the locking notches 121 and forcing the male buckle member 22 to slide into the female buckle member 14 from the opening above the female buckle member 14, then rotating the male buckle member 22 to insert the locking block 251 into the receiving chamber 15 for securing the connection between the battery strap 20 and the main body 10. In summary, the battery strap 20 and the main body 10 in this invention can be detached and fastened with each other by the structure of female and male buckle members 14, 22, and help users change the battery strap 20 easier.

It will be understood that the embodiments of the present invention disclosed herein are by way of example only, and are is not to be taken as limitation in all aspects. The scope of the present invention is defined, not by the description set forth above, but by the appended claims, and all changes that fall within the limits and bounds of the claims, or equivalence thereof are intended to be embraced by the claims.

What is claimed is:

1. A wearable electric device, comprising:

a main body with a circuit module inside and at least a detachable battery strap with a battery module inside, the main body and the detachable battery strap being detachably fastened together, the main body having a pair of side walls and a bottom wall extended from an edge of the main body, the side walls being bilaterally spaced on two sides of the main body;

a female buckle member being formed by the side walls and the bottom wall on the edge of the main body and the female buckle member including a receiving chamber, a pair of locking notches arranged on respective sides of the receiving chamber and a plurality of metal conductive points connected with the circuit module, a conducting face being formed on a slant inner surface of the receiving chamber within the female buckle member and between the two side walls, the plurality of metal conductive points being arranged on the conducting face, and the angle between the bottom wall and the conducting face being in a range between 30 to 60 degrees; and a male buckle member being attached on a front part of the detachable battery strap to be fastened with the female buckle member, the male buckle member including a pair of side faces respectively arranged, a connecting face and a bottom face, a pair of locking grooves respectively formed on the two side faces for receiving the locking notches, a plurality of pogo pin connectors connected with the battery module and arranged on the connecting face for connecting with the metal conducting points, and a locking block extended from the bottom face of the male buckle member and embedded in the receiving chamber for fastening with the receiving chamber.

* * * * *